Nov. 7, 1967 T. C. McNULTY ETAL 3,351,784
MULTIPLE JUNCTION SEMICONDUCTOR DEVICE AND
CIRCUIT FOR INCREASING ITS SPEED OF
OPERATION BY SATURATION PREVENTION
Filed July 19, 1965

INVENTORS
T. C. McNULTY
F. J. ZIEMBA
BY Robert Q. Green
ATTORNEY 3,351,784

MULTIPLE JUNCTION SEMICONDUCTOR DEVICE AND CIRCUIT FOR INCREASING ITS SPEED OF OPERATION BY SATURATION PREVENTION

Thomas C. McNulty, Nutley, and Frank J. Ziemba, Perth Amboy, N.J., assignors to Burroughs Corporation, Detroit, Mich., a corporation of Michigan Filed July 19, 1965, Ser. No. 472,885
6 Claims. (Cl. 307—88.5)

ABSTRACT OF THE DISCLOSURE

The disclosure is of a circuit for operating a four-electrode semiconductor device which includes anode, anode gate, cathode, and cathode gate electrodes. The cathode electrode is used for applying turn off pulses, the cathode gate electrode is used for applying input pulses and turning the device on, and the anode gate electrode is used as an output electrode. When the device is turned on, current flows from the anode electrode, through the device, and through the cathode electrode to ground. In order to speed up turn off and turn on of the device, a diode is connected between a point on the anode circuit and the output or anode gate electrode to bypass some of the anode-to-cathode current. This operation prevents the device from going into saturation and thereby facilitates its being turned off by pulses applied to the cathode. The above-described device and circuit comprise a module, a plurality of which may be connected in series to provide a multiple stage counter.

This invention relates to a multiple junction semiconductor device operable as a switch and circuits for operating the device at high frequencies.

Semiconductor devices used as switches in switching circuits are limited in frequency and speed of operation due to a phenomenon known as saturation delay. Such delay is produced by accumulation, in the base material, of charge carriers which are injected from the emitter and are not completely drawn off by the collector when the device operates in saturation. In saturation operation, charge carriers tend to be injected after the device has been switched off, and these charge carriers tend to be stored. Because of this, the device cannot be turned off. Various circuits have been proposed for eliminating this effect or for largely limiting the operational consequences thereof for three-electrode transistors. However, none of these proposals has been completely effective, and the problem is more troublesome with the more complicated devices now in use such as those having four electrodes and known as silicon controlled switches (SCS devices).

Accordingly, the objects of the present invention concern the provision of an improved circuit for overcoming charge storage effects in semiconductor devices so that they can be operated at higher frequencies.

Briefly, a circuit embodying the invention includes a semiconductor device which includes four electrodes consisting of cathode, cathode gate, anode, and anode gate. In such a device the cathode gate is operated as the input electrode, and the anode gate is operated as the output electrode. According to the invention, the circuit elements coupled to the device are such that the device is able to operate as a switch in normal fashion, but it is prevented from operating in saturation and the charge storage effect is minimized, with the result that the device can be operated at higher speeds than those which could be achieved with ease heretofore.

The invention is described in greater detail by reference to the drawing, wherein.

Figure 1:
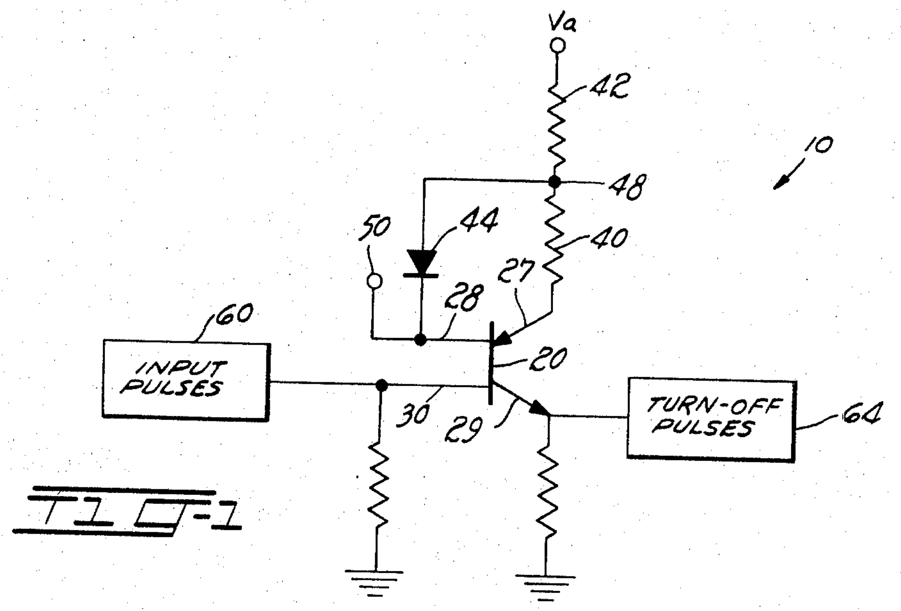
FIG. 1 is a schematic representation of a circuit embodying the invention.

Referring to FIG. 1, a switching circuit 10 includes a four-electrode semiconductor device 20 known as a silicon controlled switch or SCS device. The electrodes of device 20 include anode 27, anode gate 28, cathode 29, and cathode gate 30, as is well known, with the cathode gate 30 generally operated as the input electrode and the anode gate 28 operated as the output electrode.

In the circuit 10, the anode 27 is coupled through first and second resistors 40 and 42 to a positive D.C. bias power source V*a*. The anode gate 28 is connected to the cathode of diode 44 which has its anode connected to the junction 48 of the anode resistors 40 and 42. The anode gate is also provided with an output terminal 50 which may be connected to a display device as a 6844A tube.

The cathode gate electrode 30 is connected through a resistive path to a reference potential such as ground and to a source 60 of input signal pulses which in this case are positive pulses. The cathode electrode 29 is connected through a resistive path to ground and to a source 64 of turn-off pulses used to turn off the device 20 after it has been turned on and is storing information. The turn-off pulses are also positive pulses.

In operation of the device 20 in FIG. 1, assuming that the device is off, then a positive pulse applied from source 60 to cathode gate 30 causes current to flow from source V*a* through the device 20 to ground. The current from source V*a* divides and flows in part through the resistor 40 and in part through diode 44. The circuit components are selected so that sufficient current, known as holding current, flows through the anode to cathode path to cause the device to switch on. However, with the current from V*a* thus divided, the device 20 cannot enter the saturation state and charge carriers will not be stored. Thus, when an erase pulse is applied, the device 20 can be turned off immediately, and it is ready for the next turn-on operation. In this way, its speed of operation is increased to a frequency of about one megacycle per second while the frequency of operation in prior art circuits is about 125 kc. per second. The circuit 10 can also operate with voltage V*a* in the range of about 9 to about 30 volts, whereas prior art circuits required this voltage to be limited to the range of about 9 to about 18 volts.

Figure 2:
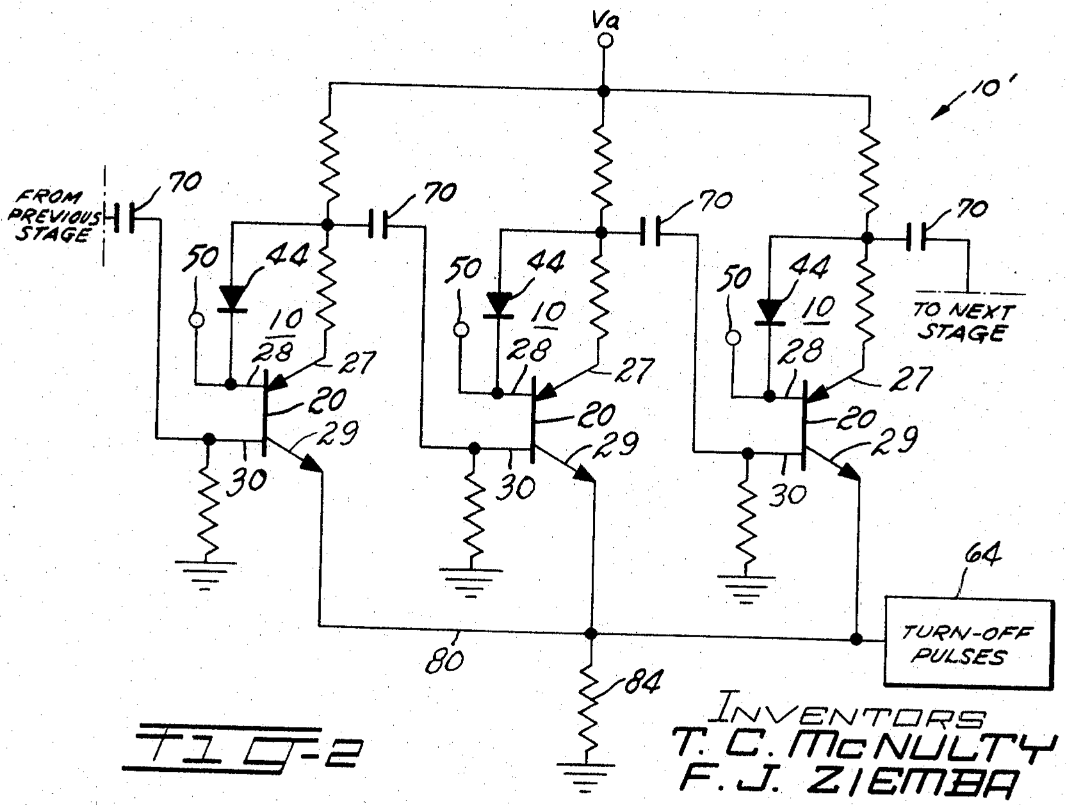
FIG. 2 is a schematic representation of the circuit of FIG. 1 in a counter circuit.

The device and circuit shown in FIG. 1 may be embodied in a counting circuit 10′ such as that shown in FIG. 2. Counting circuits commonly use ten SCS devices to provide ten counting positions; these are known as decade counters. For purposes of illustration, only three SCS devices are shown arranged as a counter. Essentially, the counting circuit 10′ includes a plurality of series-connected circuits 10 of FIG. 1 except that the output circuit of each anode 27 is also coupled through a capacitor 70 to the cathode gate 30 of the next adjacent leading device 20 in the counting series. A source 64 of turn-off pulses or counting pulses is coupled through bus 80 to all cathode electrodes 29, and the bus 80, in turn, is connected through a resistive path 84 to ground.

In operation of the counter circuit 10′, the counter is set in operation by means of the application of a positive pulse to the cathode gate of the first device in the counting chain, and, as positive pulses from source 64 are applied to bus 80, the device 20 which is on is turned off. As this device is turned off, its anode electrode 27 rises to a positive potential which is coupled through the capacitor 70 to the cathode gate 30 of the adjacent leading device 20, and this device is thus caused to turn on. Each input or counting pulse from source 64 causes the same operations to occur, and, in this way, the counter steps from position to position.

Of course, it is to be understood that the principles of the invention illustrated in the circuit 10 in FIG. 1 can be used in circuits other than counters as shown in FIG. 2.

With the principles of the invention thus set forth, those skilled in the art will be able to practice the invention and design circuit 10 for any SCS device 20 or any diode 44 they might desire to use. The voltage drop of a diode, the holding and saturation currents of an SCS device, and the various voltage drops across the junction of an SCS device can be readily determined so that selection of resistor 40 and all of the other circuit components to provide the required current flow is a relatively simple matter.

What is claimed is:

1. An electronic circuit module for performing counting and storage operations comprising
- a four-electrode semiconductor device including anode, anode gate, cathode, and cathode gate electrodes, said device having (1) a characteristic holding current level at which the device switches on and (2) a characteristic saturation current level above which the device goes into saturation,
- said anode, anode gate, cathode gate, and cathode comprising a first current flow path,
- a first potential coupled to said anode at one end of said first current flow path and a second potential coupled to said cathode at the other end of said current flow path whereby current can flow through said first path from said one end to said other end, and
- an auxiliary current flow path in parallel with said first current flow path and cooperating with said first path to maintain the current flow in said first path below the saturation current level of said device.

2. An electronic circuit module for performing counting and storage operations comprising
- a four-electrode semiconductor device including anode, anode gate, cathode, and cathode gate electrodes, said device having (1) a characteristic holding current level at which the device switches on and (2) a characteristic saturation current level,
- said anode, anode gate, cathode gate, and cathode comprising a first current flow path,
- a first potential coupled to said anode at one end of said first current flow path and a second potential coupled to said cathode at the other end of said current flow path whereby current can flow through said first path from said one end to said other end, and
- an auxiliary current flow path in parallel with said first current flow path and cooperating with said first path to maintain the current flow in said first path below the saturation current level of said device.

3. An electronic circuit module for performing counting and storage operations comprising
- a four-electrode semiconductor device including anode, anode gate, cathode, and cathode gate electrodes, said device having (1) a characteristic holding current level at which the device switches on and (2) a characteristic saturation current level,
- said anode, anode gate, cathode gate, and cathode comprising a first current flow path,
- a first potential coupled to said anode at one end of said first current flow path and a second potential coupled to said cathode at the other end of said current flow path whereby current can flow through said first path from said one end to said other end, and
- an auxiliary current flow path including a diode in parallel with said first current flow path and adapted to receive current from said source and cooperating with said first path to maintain the current flow in said first path below the saturation current level of said device.

4. An electronic circuit module for performing counting and storage operations comprising
- a four-electrode semiconductor device including anode, anode gate, cathode, and cathode gate electrodes, said device having a characteristic holding current level at which the device switches on and a saturation current level,
- said anode, anode gate, cathode gate, and cathode comprising a first current flow path,
- a voltage source coupled through a resistive current flow path to said anode electrode at one end of said first current flow path, said current flow path extending through said device and out of the device through said cathode electrode to ground, and
- an auxiliary current flow path extending from a point on said resistive current flow path through a diode into said anode gate of said device,
- said diode and said resistive path combining to permit a current to flow in said first path which is equal to or greater than the holding current of said device but smaller than its saturation current.

5. An electronic counter circuit for performing signal counting and storage operations comprising
- a plurality of four-electrode semiconductor devices connected in a series, each device including anode, anode gate, cathode, and cathode gate electrodes, said devices having a characteristic holding current level at which the device switches on and a saturation current level,
- a voltage source coupled through a resistive current flow path to said anode electrode of each device, said current flow path extending through each device and out of the device through said cathode electrode,
- an auxiliary current flow path extending from a point on said resistive current flow path through a diode into said anode gate of each device,
- all of the cathodes of said devices being connected together,
- said diode and said resistive path combining to permit a current to flow which is equal to or greater than the holding current of said device but smaller than its saturation current, and
- a coupling connection from the anode electrode of each device to the cathode gate electrode of the next adjacent device in the counting series whereby counting pulses are transmitted from one device to the next.

6. The circuit defined in claim 5 wherein a source of pulses to turn off said devices is coupled to all of the cathode electrodes.

References Cited

UNITED STATES PATENTS

| | | | |
|---|---|---|---|
| 2,949,549 | 8/1960 | Hoge | 307—88.5 |
| 2,990,478 | 6/1961 | Scarbrough | 307—88.5 |
| 3,105,159 | 9/1963 | Ditkofsky | 307—88.5 |

FOREIGN PATENTS

| | | |
|---|---|---|
| 215,148 | 5/1958 | Australia. |

OTHER REFERENCES

"Junction Transistor Electronics," by Hurley *d+d*, 1958, pp. 382–386, FIG. 20–8 is pertinent, Wiley and Sons.

ARTHUR GAUSS, *Primary Examiner.*

S. D. MILLER, *Assistant Examiner.*